United States Patent
Herbst

(10) Patent No.: US 11,212,463 B2
(45) Date of Patent: Dec. 28, 2021

(54) METHOD FOR VISUALLY REPRESENTING SCANNING DATA

(71) Applicant: LEICA GEOSYSTEMS AG, Heerbrugg (CH)

(72) Inventor: Christoph Herbst, Dornbirn (AT)

(73) Assignee: LEICA GEOSYSTEMS AG, Heerbrugg (CH)

( * ) Notice: Subject to any disclaimer, the term of this patent is extended or adjusted under 35 U.S.C. 154(b) by 238 days.

(21) Appl. No.: 15/795,705

(22) Filed: Oct. 27, 2017

(65) Prior Publication Data

US 2018/0124330 A1  May 3, 2018

(30) Foreign Application Priority Data

Oct. 27, 2016 (EP) ..................................... 16196052

(51) Int. Cl.
*H04N 5/272* (2006.01)
*G06T 15/00* (2011.01)
(Continued)

(52) U.S. Cl.
CPC .............. *H04N 5/272* (2013.01); *G01C 11/00* (2013.01); *G01C 15/002* (2013.01); *G06T 15/00* (2013.01);
(Continued)

(58) Field of Classification Search
CPC ............... H04N 5/272; H04N 5/23203; H04N 5/23216; H04N 5/23238; G01C 11/00; G01C 15/002; G06T 15/00
See application file for complete search history.

(56) References Cited

U.S. PATENT DOCUMENTS 5,185,667 A * 2/1993 Zimmermann ....... G06T 3/0018
348/143
5,396,583 A * 3/1995 Chen ..................... G06T 3/0043
345/427
(Continued)

FOREIGN PATENT DOCUMENTS

CN        103337095 A     10/2013
DE  10 2010 020 925 A1   11/2011
(Continued)

OTHER PUBLICATIONS

European Search Report dated May 26, 2017 as received in Application No. 16196052.1.

*Primary Examiner* — William C Vaughn, Jr.
*Assistant Examiner* — Naod W Belai
(74) *Attorney, Agent, or Firm* — Maschoff Brennan

(57) ABSTRACT

Method for visually representing scanning data, which are composed of a multiplicity of individual measurement data. The individual measurement data in each case have at least one measurement value that is linked to a respective measurement direction, wherein the measurement directions are different from one another such that a predetermined scanning region with a predetermined scanning resolution is covered. The representation of the scanning data is effected by way of an image map with a number of map points that is dependent on a predetermined display resolution and by way of an assignment rule for assigning measurement value to map point, wherein the assignment is effected immediately on the basis of the respective measurement direction that is linked to the measurement value.

14 Claims, 4 Drawing Sheets

(51) Int. Cl.
*G01C 15/00* (2006.01)
*G01C 11/00* (2006.01)
*H04N 5/232* (2006.01)

(52) U.S. Cl.
CPC ..... *H04N 5/23203* (2013.01); *H04N 5/23216* (2013.01); *H04N 5/23238* (2013.01)

(56) References Cited

U.S. PATENT DOCUMENTS

| | | | | |
|---|---|---|---|---|
| 5,687,307 | A * | 11/1997 | Akisada | G06F 3/011 345/419 |
| 6,201,574 | B1 * | 3/2001 | Martin | G06T 3/0062 348/315 |
| 6,243,131 | B1 * | 6/2001 | Martin | G06T 3/0018 348/36 |
| 6,317,127 | B1 * | 11/2001 | Daily | G06T 15/10 345/629 |
| 6,515,664 | B1 * | 2/2003 | Hii | G06T 3/0043 345/427 |
| 7,161,616 | B1 * | 1/2007 | Okamoto | G06T 3/4038 348/148 |
| 7,714,936 | B1 * | 5/2010 | Martin | H04N 7/002 348/576 |
| 7,990,397 | B2 * | 8/2011 | Bukowski | G06T 17/00 345/422 |
| 9,329,271 | B2 * | 5/2016 | Ossig | G01S 7/51 |
| 9,645,240 | B1 * | 5/2017 | Ossig | G01S 17/42 |
| 9,939,890 | B2 * | 4/2018 | Oto | H04N 5/64 |
| 10,146,333 | B1 * | 12/2018 | Smith | G06T 15/00 |
| 10,593,014 | B2 * | 3/2020 | Suitoh | G06T 3/005 |
| 2002/0126129 | A1 * | 9/2002 | Snyder | G06T 3/0031 345/582 |
| 2004/0247173 | A1 * | 12/2004 | Nielsen | H04N 5/2628 382/154 |
| 2006/0181527 | A1 * | 8/2006 | England | G01S 17/89 345/419 |
| 2006/0182314 | A1 * | 8/2006 | England | G01C 15/002 382/106 |
| 2008/0088623 | A1 * | 4/2008 | Bukowski | G06T 17/00 345/423 |
| 2010/0026982 | A1 * | 2/2010 | Kludas | G01C 11/025 356/4.01 |
| 2012/0033069 | A1 * | 2/2012 | Becker | G01S 17/42 348/135 |
| 2015/0085068 | A1 * | 3/2015 | Becker | G06T 7/521 348/39 |
| 2015/0178594 | A1 * | 6/2015 | Curington | G06K 9/00201 382/154 |
| 2015/0341552 | A1 * | 11/2015 | Chen | G06T 17/00 348/38 |
| 2016/0033643 | A1 * | 2/2016 | Zweigle | G05D 1/0044 356/5.01 |
| 2016/0047914 | A1 * | 2/2016 | Zweigle | G09B 29/004 356/5.01 |
| 2016/0307369 | A1 * | 10/2016 | Freedman | G06T 19/00 |
| 2017/0301132 | A1 * | 10/2017 | Dalton | G06T 7/521 |
| 2018/0122129 | A1 * | 5/2018 | Peterson | H04N 21/854 |
| 2018/0124330 | A1 * | 5/2018 | Herbst | G01C 11/00 |
| 2018/0164593 | A1 * | 6/2018 | Van Der Auwera | H04N 21/816 |
| 2018/0205926 | A1 * | 7/2018 | Mogalapalli | G06T 7/521 |
| 2018/0240276 | A1 * | 8/2018 | He | G06T 3/0087 |
| 2018/0299551 | A1 * | 10/2018 | Bellett | G01S 17/50 |
| 2019/0025411 | A1 * | 1/2019 | Kuroda | G01S 17/89 |

FOREIGN PATENT DOCUMENTS

| | | |
|---|---|---|
| EP | 2 947 630 A1 | 11/2015 |
| WO | 2016/055757 A1 | 4/2016 |

* cited by examiner

METHOD FOR VISUALLY REPRESENTING SCANNING DATA

FIELD OF INVENTION

The invention relates to a method for visually representing scanning data. More particularly, the invention relates to a method for visually representing scanning data along with a measurement system having scanning functionality.

BACKGROUND 3D scanning is a highly effective technique for producing millions of individual measurement data points, in particular 3D coordinates, within minutes or seconds. Typical measurement tasks are the recording of objects or of the surfaces of objects, such as industrial installations, building facades or historical buildings, but also at accident sites and crime scenes. Measurement devices having scanning functionality are, for example, total stations and laser scanners, such as the Leica P20 or Leica Multi Station 50, which are used to measure or create 3D coordinates of surfaces. For this purpose they must be able to guide the measurement beam—typically a laser beam—of a distance measurement apparatus over a surface and to successively capture in this way, at a specified scanning or measurement rate, the direction of and the distance from the respective measurement point at the same time for different measurement directions. Direction and distance are here in reference to a measurement reference point, such as the location or the zero point of the measurement device, are located in other words within a common reference or coordinate system, with the result that the individual measurement directions, and thus the individual measurement data, are linked to one another via the common measurement reference point. It is then possible, based on the distance measurement value and the correlated measurement direction for each point, to generate what is known as a 3D point cloud from the multiplicity of the scanned points, in particular using an external data processing facility.

Regarding the principle construction, stationary scanners of this type are configured to capture a distance from an object point as a measurement point using a rangefinder which is usually based on electro-optics and lasers. For example, the rangefinder can be designed in accordance with the principles of time-of-flight (TOF), phase, waveform digitizer (WDF) or interferometric measurement. For fast and accurate scanners, in particular a short measurement time with simultaneously high measurement accuracy is required, for example a distance accuracy in the mm range or below, with measurement times of the individual points being in the range of sub-microseconds to milliseconds. The measurement range here ranges from a few centimeters to a few kilometers.

A measurement direction deflection unit, which is likewise present, is here configured such that the measurement beam of the rangefinder is deflected into at least two independent spatial directions, i.e. the measurement direction is continuously changed, as a result of which a (partially) spherical spatial measurement or scanning region can be recorded. The scanning region in the horizontal is here frequently 360°, i.e. one full circle, and in the vertical for example 180°, with the result that at least one hemisphere is covered. The scanning resolution with which the scanning region is covered is here obtained by way of the number of measurements or, in other words, the number of the measured points per spatial region or spherical surface element.

The deflection unit can be realized in the form of a moving mirror or, alternatively, by way of other elements suitable for controlled angular deflection of optical radiation, such as for example rotatable prisms, movable waveguides, deformable optical components etc. The measurement is typically effected by determining distance and angles, i.e. in spherical coordinates, which can also be transformed into Cartesian coordinates for the purposes of representation and further processing.

The representation of the 3D scanning data in the form of a projection onto the plane of a surface display is prior art. By way of this type of representation, visualization of the scanning data on a display of the measurement device immediately after the scan is possible, which permits e.g. some degree of checking of the scanning quality. However, this entails strong geometry distortions owing to the scanning data being recorded in a spherical coordinate system, e.g. straight lines are represented on the display as curved lines.

WO 2016/055757 proposes a method for visually representing scanning data, by way of which geometry distortions are avoidable. The scanning data are here projected onto cuboid surfaces after scanning with the measurement device on an external scanning data server, wherein the center of the cube coincides with the center of the projection. The scanning data are here converted into spherical panorama textures, and subsequently converted into corresponding cube maps. The method disclosed here therefore disadvantageously entails a significant computational effort, as a result of which visual representation by way of a computational unit of the measurement device or in situ is not possible. WO 2016/055757 therefore describes the method as a first step for subsequent rendering.

For a geometrically completely correct visual representation, the scanning data additionally need to be corrected before the projection by taking into account the geometry errors of the measurement device in postprocessing. This requires additional computational capacity, as a result of which, in particular considering the great power of the scanning data, such a geometry-corrected representation in a timely manner after the measurement process is currently not possible by way of methods of the prior art.

SUMMARY

It is therefore an object of some embodiments of the present invention to provide an improved method for visually representing scanning data.

It is a further object of some embodiments to provide a simplified method for visually representing scanning data as a cube representation.

Another object of some embodiments of the invention is to provide a simplified method for the error-corrected visual cube representation of scanning data.

This object is achieved by way of realizing the characterizing features of the independent claims. Features that develop the invention in an alternative or advantageous fashion can be found in the dependent patent claims and in the description, including the description of the figures. All embodiments of the invention illustrated or otherwise disclosed in this document may be combined with one another, unless expressly stated otherwise.

Some embodiments of the invention relate to a method for visually representing scanning data which are recorded using an, in particular stationary, measurement device having a scanning functionality for recording object surfaces by way of measurement radiation, in particular laser radiation.

The measurement device is preferably a laser scanner or a total station. The scanning data are composed of a multiplicity of individual measurement data items that each have at least one measurement value linked to a respective measurement direction. The at least one measurement value is in each case a distance measurement value, measured using the measurement radiation, relating to a surface point located in the measurement direction. All measurement directions start at a common measurement reference point, and the measurement directions differ from one another such that a specified scanning region with a predetermined scanning resolution is covered. The scanning region preferably comprises 360° in the horizontal and approximately 270° in the vertical.

The representation of the scanning data is additionally effected by way of an image map with a number of map points that depends on a predetermined display resolution. The representation of the scanning data is here effected, in accordance with the invention, by way of an assignment rule for assigning a measurement value, in particular distance value, to a map point, wherein the assignment is effected directly on the basis of the respective measurement direction that is linked to the measurement value. The generation of the image map is preferably effected by way of an assignment rule for assigning measurement value to map point, wherein the assignment is effected directly on the basis of the respective measurement direction that is linked to the measurement value.

Optionally, the image map is configured in the form of a cube map, and the representation is effected as a cube representation. The cube representation is here preferably distortion-free, with the result that a geometrically corrected representation of the scanning data is attained.

As a further option, the representation of the scanning data is effected by way of a display unit having a number of display points that are arranged over the surface. A brightness and/or color value, which represents a measurement value, is assigned to each display point by way of the assignment rule in dependence on a respective field of vision (FoV) to be displayed as a section of the image map, wherein the measurement value belongs to one of the recorded surface points located in the field of vision.

In a development of the method according to some embodiments of the invention, systematic device errors, in particular axial errors, of the measurement device are taken into consideration in the assignment rule, with the result that the representation of the scanning data is effected on the basis of the error-correcting assignment rule in a device-error-corrected fashion.

Optionally, the systematic device errors for the measurement device are determined individually by way of a calibration process in the form of calibration parameters, and the device errors are taken into consideration in the assignment rule on the basis of the calibration parameters. Alternatively or additionally, the systematic device errors relate to angular measurements for determining the measurement directions, with the result that, in this further development, error correction of the measurement directions is effected.

In another development, the assignment is carried out such that it is matched to the selected display resolution, i.e. the assignment is matched to a specific resolution with which the representation is intended to be effected. The adaptation is preferably effected by uniformly reducing the scanning resolution over the entire scanning region to the display resolution by selecting measurement directions and thus individual measurement data from the multiplicity as part of the assignment.

Optionally, the selection is effected by way of assigning each map point the measurement value of the closest measurement direction. However, preferably assigned to each map point is the measurement value of that measurement direction of the close-by measurement directions that has a comparatively high measurement value quality and/or information content. In other words, in this development, criteria of quality or of the information content are taken into consideration during the selection. For example, individual measurement data having a comparatively high quality, e.g. individual measurement data having a comparatively good signal-to-noise ratio, and/or a high information content, i.e. e.g. individual measurement data that signify a high volume of information over the scanned object surface, are preferably thus selected. This advantageously avoids that particularly high-quality and/or informative scanning data are not selected and thus not used for the representation.

As a further option, during an adapted assignment of this type, based on the assignment rule, and adapted to the selected display resolution, a reduced scanning data set is created and is transferred wirelessly to an external data processing device. The transfer is effected preferably by way of the reduced scanning data set initially being transmitted from the measurement device to a data transmission device, in particular a field controller, tablet or smartphone, in situ and being transferred from the data transfer device by way of radio network, in particular by way of LTE, to the external data processing device. Alternatively or additionally, the scanning data set is edited and an edited scanning data set is created by way of the external data processing device. Parts of the edited scanning data set or the entire edited scanning data set are/is then transferred back, e.g. to the measurement device or to a tablet in situ, where they are/it is taken into consideration optionally in the representation of the scanning data by way of a display unit, for example the measurement device or tablet.

The measurement reference point is preferably a center of the measurement device and/or, in the case of an image map that is in the form of a cube map, corresponds to the center point of the cube. The measurement directions are preferably in the form of polar and azimuth angle, i.e. in each case a polar angle and an azimuth angle is measured for the measured determination of a measurement direction as part of the present method. The assignment is preferably also carried out exclusively on the basis of the respective measurement direction that is linked to the measurement value, with the result that further (measurement) variables have no influence on the assignment and thus the representation (aside from method variants involving taking into consideration systematic device errors, and even then, no values or variables that were measured directly in connection with the scanning process are included in the assignment, but rather previously determined values).

Optionally, the assignment rule is in the form of a look-up table, in which the assigned measurement values are directly retrievable for each map point or, in the case of a plurality of assigned measurement values, these are retrievable.

Alternatively or additionally, a regular grid is formed by way of the measurement directions, and the individual measurements are stored in a matrix, imaging the regular grid, with a column and row index, wherein each map point is assigned one field of the matrix.

In another development of the method according to some embodiments of the invention, automatic adaptation of the representation in dependence on the selected field of vision, preferably adaptation of the brightness with which the map points are to be displayed, and/or in dependence on the alignment of a representing display unit (GUI) relative to the scanning region, preferably adaptation of the represented field of vision, is effected. Such automatic adaptation is effected especially if the representation, as described above, takes place on an external device, such as a smartphone, a tablet, augmented reality spectacles or a head-up display.

As a further option, metadata, such as for example texts, images, voice memos, CAD data, point coordinates or a distance between two object points determined on the basis of the scanning data or an angle between two lines is linked to a map point or to a measurement value that is assigned, preferably permanently, to the map point by way of a display point, with the result that these metadata are preferably representable combined with the measurement value, i.e. by the metadata being stored as additional map layers, wherein the metadata layers are displayed together with the measurement value layers.

In another development of the method according to some embodiments of the invention, the representation is effected in situ, specifically on a display unit (GUI) of the measurement device. Alternatively or additionally to the representation on a display unit of the measurement device, the representation is effected on an external device that is connected to the measurement device, preferably wirelessly or even in wire-bound fashion, e.g. a data processing device having a display unit (GUI), preferably a tablet or a smartphone. The representation on an external device offers the advantages that the latter typically has a better or larger display than a measurement device, with the result that visualization of the scanning data that is clearer and more informative for a user is possible. Such devices, e.g. a mobile computer, additionally frequently have a more convenient or simpler operation and/or better computational power than a measurement device, with the result that e.g. any data processing or editing can be performed better, or at all, by way of the external device. If, optionally, such a wirelessly connected or wire-bound device is, for example, a display unit that is configured in the form of augmented reality spectacles and/or a display unit in the form of a head-up display, this offers for example the known advantages of augmented reality and, in contrast to a handheld device, free user hands.

Optionally, the representation in situ is effected immediately after the scanning data recording or already during the scanning data recording for already recorded scanning data. Alternatively or additionally, the representation in situ serves for the purposes of checking the scanning data, preferably for completeness.

In addition to the distance measurement value, at least one of the following measurement values is assigned, as a further option, to a cube point by way of the assignment rule and is thus representable individually or combined with other measurement values: intensity of the measurement radiation, noise factor, measurement accuracy, scanning data density (i.e. how many individual measurement data items are present per spatial region or surface region), color information relating to the scanning region that is recorded by way of a camera. Preferably, the different measurement values are held as different image map layers.

In another development, two or more scanning data sets that were recorded by way of the measurement device at different locations are linked, wherein the linking preferably involves a rough alignment of the scanning data sets or of the recorded object surfaces that represent the scanning data sets with respect to one another. The link is optionally effected manually on the basis of the representation, preferably by marking display points or common features and/or display regions on a representing display unit, e.g. by way of a touch-sensitive display unit. Alternatively or additionally, the link is effected automatically by using additional positional data that are provided by a position measurement unit, in particular an IMU, a GPS receiver and/or a video tracker, of the measurement device. As a further option, the linking is followed by a display of the linked scanning data sets on a display unit, which preferably serves for visual checking.

The method according to some embodiments of the invention offer the advantage that, due to the representation by way of an image map, a representation which is faithful to geometry is made possible, and in the process the generation of the image map is made significantly easier, as compared to methods of the prior art, by the assignment directly on the basis of the respective measurement direction that is linked to the measurement value a representation of scanning data. The simple assignment or calculation rule requires only little computational effort (even in embodiments according to the invention with device error correction, because the correction is static), with the result that the calculations that are required for a representation are possible without difficulty very quickly and e.g. also with the low—as compared to office computers—computational capacity of a laser scanner, total station or tablet or smartphone, with the result that visualization of the scanning data in situ and directly after the scanning operation is possible and the representation is additionally effected in geometrically correct fashion—in particular by using a cube map. This permits e.g. direct checking of the scanning data, with the result that e.g. scanning errors or scanning gaps are immediately detectable and, if necessary, correctable by the user. In contrast, such representation is not possible in situ using methods of the prior art, but only during post processing in the office, such that the correcting of scanning errors or scanning gaps is much more complicated or sometimes not even possible at all.

In the case of a method according to some embodiments of the invention with assignment that is adapted to a display resolution, there is the additional advantage that the computational effort is further reduced, because it is no longer necessary to take into consideration all measurement directions or individual measurement data items. In addition, it is thus possible to create a reduced scanning data set, i.e. a lower data volume, which makes possible a quick wireless transfer of representable scanning data, without losing the measurement value information (due to the assignment), to external display and/or data processing devices, such as for example a tablet or a smartphone or even an office device. It is advantageous here that the scanning data can also be edited on such an external device—e.g. also immediately after the scan or even during the scan—and sent back to the measurement device. As a result, e.g. editing of scanning data that is simultaneous and effected from different locations by a plurality of users is possible.

Some embodiments of the present invention furthermore include a computer program product that is stored on a machine-readable carrier, or a computer data signal, embodied by an electromagnetic wave, with program code, for controlling or performing the method according to the invention.

Some embodiments of the present invention additionally relate to a measurement system having a scanning functionality, in particular having a measurement device in the form of a laser scanner or a total station. The measurement system has a control and evaluation unit, which is arranged in the measurement device or in a data processing device that is connected thereto in situ, but is physically separate therefrom, such as e.g. a tablet or a smartphone. In accordance with the invention, the control and evaluation unit is here configured to perform the method according to the invention.

BRIEF DESCRIPTION OF THE DRAWINGS

The method according to the invention and the apparatus according to the invention will be described in more detail below with reference to the statements and application processes which are schematically illustrated in the drawings.

Specifically,

FIG. 1 shows a stationary measurement device 90 having a scanning functionality for recording object surfaces 100, e.g. in the form of a laser scanner. The device is here configured for emitting measurement radiation 91 in accordance with a specified measurement direction 1, receiving measurement radiation 91 that is reflected by the surface 100, and the evaluation thereof, e.g. using time-of-flight or phase difference methods. For scanning an object surface 100, the measurement radiation 91 is continuously panned, and in each case at least one measurement value is recorded successively in short time intervals, including in each case a distance from the respective object point P, with the result that a multiplicity of measurement directions 1 is obtained and a plurality of points 98 of the object surface 100 is measured, with the result that a multiplicity of individual measurement data items are obtained which are connected to one another and form the scanning data. The measurement directions 1 are obtained, for example, as elevation or polar angle θ and horizontal or azimuth angle φ (see illustration on the left in FIG. 1) and are ascertained e.g. by way of angle sensors. The angles θ, φ form an angular space. In addition to the distance measurement value, for example a brightness or intensity value is optionally recorded. The brightness is a gray-level value which is ascertained, for example, by integrating the bandpass-filtered and amplified measurement radiation over a measurement period assigned to the object point.

Figure 1:
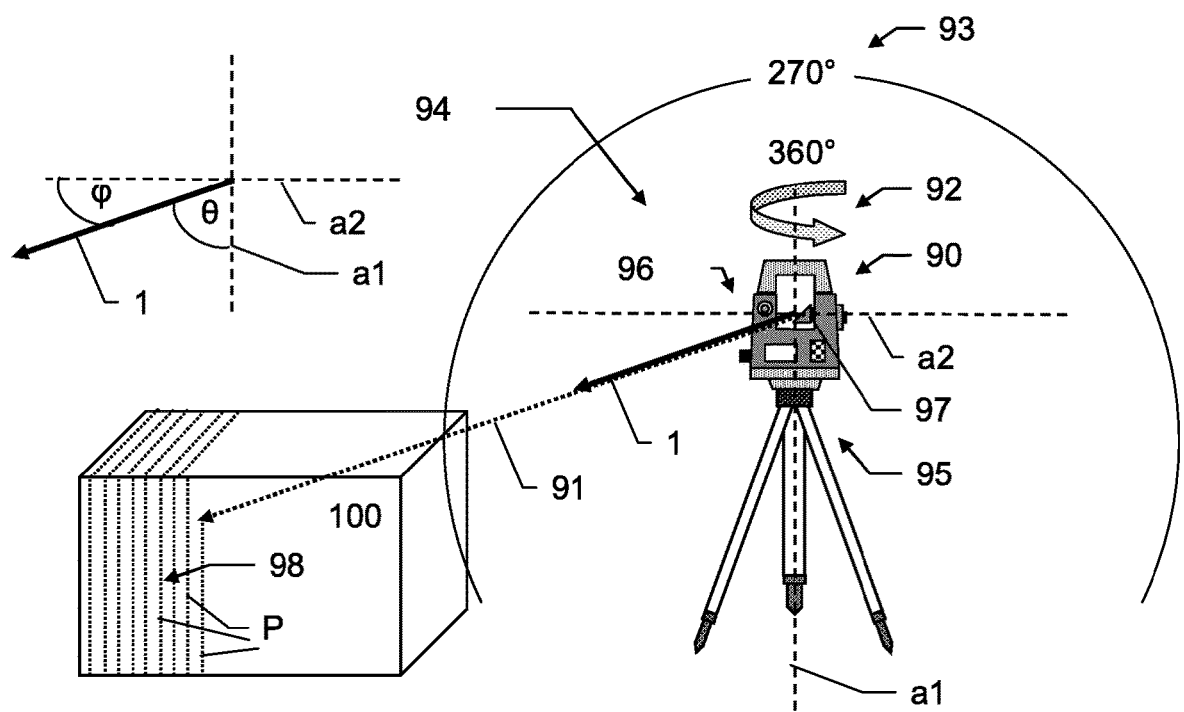
FIG. 1 shows a stationary measurement device having a scanning functionality.

Panning here takes place, as illustrated, for example by incrementally or continuously rotating—relatively slowly— an upper section 96 of the measurement device 90 with respect to a base about a first, vertical axis a1, such that the measurement radiation 91 is panned in the horizontal, and the multiplicity of measurement directions 1 differ from one another in the horizontal alignment, and by rotating— relatively quickly—a pannable optical component 97, e.g. a pivot mirror, about a horizontal axis a2, with the result that the measurement radiation 91 is panned in the vertical, and the multiplicity of measurement directions 1 differ from one another additionally in the vertical alignment. As a result, the object surface 100 is scanned e.g. with a line grid, as illustrated, having a predetermined point density or scanning resolution 98. Scanning is effected here within a predetermined scanning region 94, the boundaries of which are determined by the horizontal and vertical panning widths. The scanning region 94 is preferably 360° in the horizontal, i.e. one complete rotation about the vertical axis a1, and e.g. 270° in the vertical, with the result that a spherical scanning region 94 is obtained, which images nearly the entire surrounding area in all spatial directions. However, any desired other scanning regions 94 are also possible.

Figure 2:
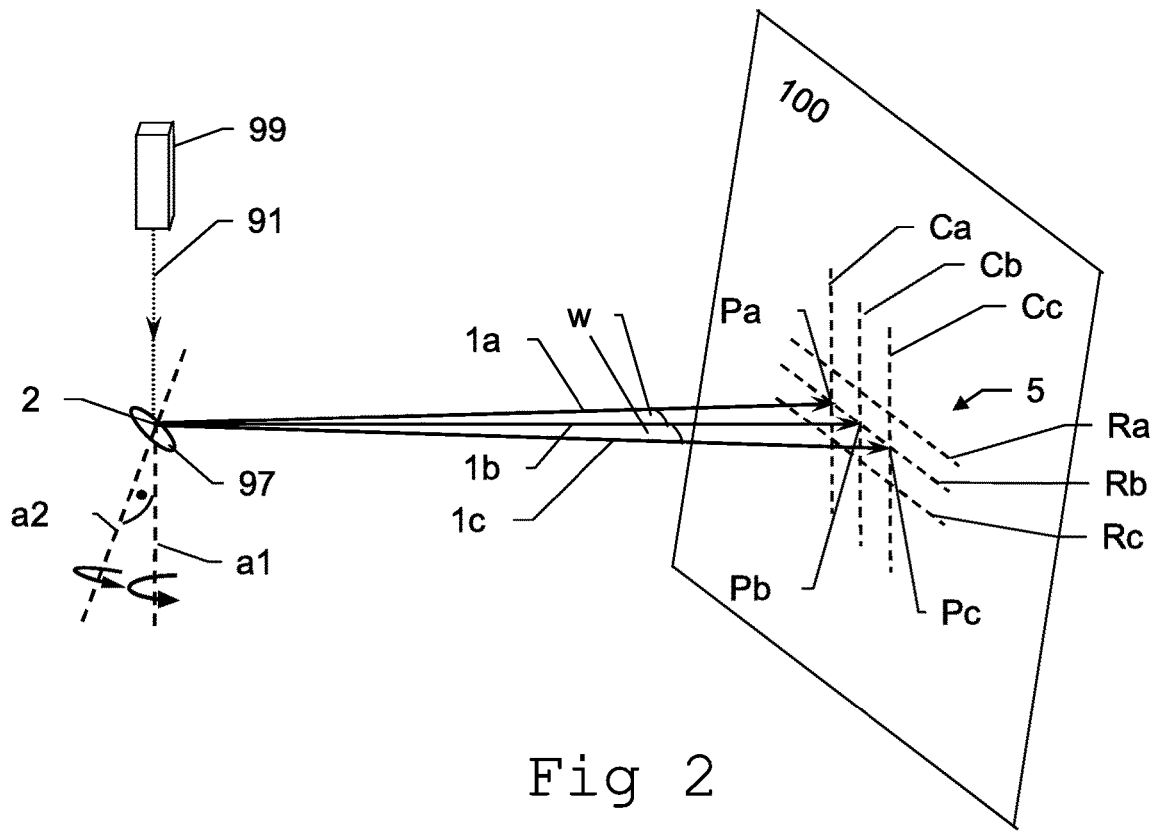
FIG. 2 shows a section of the measurement device and the recorded object surface, FIG. 3 schematically shows a principle of the method according to the invention, FIG. 4 schematically shows an assignment according to the invention by way of tables, FIG. 5 schematically shows a development of the method according to the invention, in which the assignment is adapted to the predetermined display resolution, FIG. 6 schematically illustrates an assignment that is adapted to the predetermined display resolution with uniform reduction of the scanning resolution to the display resolution, and FIGS. 7a,b schematically show another development of the method according to the invention.

FIG. 2 shows a section of the measurement device and the object surface 100. Measurement radiation 91 is emitted by a measurement unit 99, which has a measurement radiation source, e.g. a laser diode or an SLED, and a measurement radiation detector, and is directed onto the object surface 100 by way of an optical deflection element 97, which in the example is rotatable about two axes a1 and a2, which are orthogonal with respect to one another. With deliberate movement of the deflection optical unit 97, the measurement radiation 91 is panned over the object surface 100. By detecting measurement data in equal steps by way of the measurement unit 99, measurement directions $1a$, $1b$, $1c$ are determined, which start from the same measurement reference point 2 and have at least ideally the same angular distance from one another (in the example, the horizontal angular distance w is depicted). For a respective measurement direction $1a$-$c$, in each case at least one measurement value is thus captured and linked to the respective measurement direction $1a$-$c$. The at least one measurement value is here in each case a distance measurement value to a point Pa, Pb, Pc of the object surface, which is determined by evaluating reflected measurement radiation 91 that is detected using the measurement radiation detector. Due to the present linking of in each case distance to direction as individual measurement data items, with reference to a common measurement reference point, with respect to a multiplicity of points, a 3D point cloud, which represents the object surface, is generatable from the scanning data. In addition to the distance measurement value, the respective individual measurement data items optionally have at least one further measurement value, which is captured with respect to a respective measurement direction $1a$-$c$ and is linked thereto. Such measurement values are, for example, the received intensity of the measurement radiation 91, data for measurement accuracy, or a respective noise factor.

By way of uniform recording of individual measurement data items in equal steps, a regular grid 5 is formed by the measurement directions $1a$-$c$, to which grid the rows Ra, Rb, Rc and columns Ca, Cb, Cc are assigned. Accordingly, the scanning data are organized in a matrix, i.e. are kept in a table having a column and row index. Every field of the matrix which contains in each case the measurement value or values of a respective individual measurement or makes reference thereto thus corresponds to one of the measurement directions $1a$-$c$ (see FIG. 4).

Figure 3:
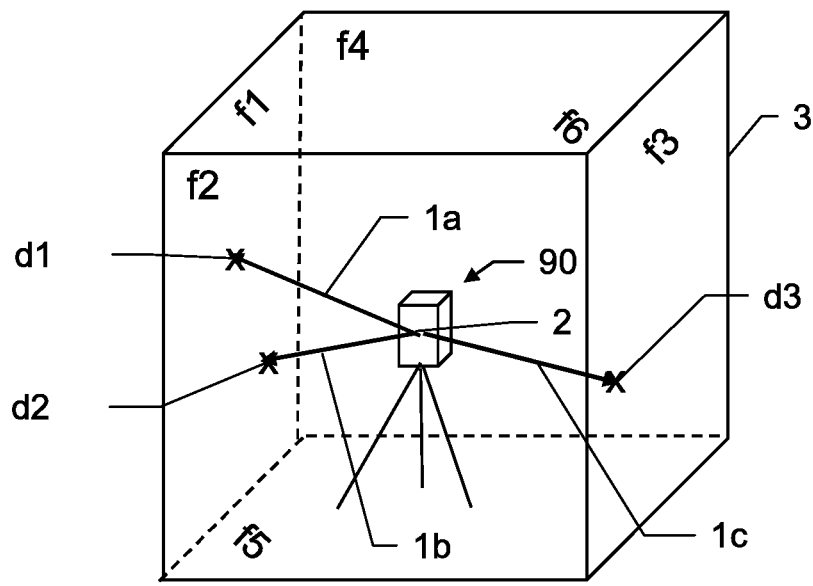

FIG. 3 shows how the method for representing the scanning data in accordance with the invention takes place in principle. The representation is effected by way of an image map 3, in the form of a cube map, as a cube representation. The center of the cube is here identical to the measurement reference point 2, with the result that the measurement device 90 can be considered to be located at the center of the cube. The cube map 3 here has a number of map points, of which three points d1, d2 and d3 are illustrated by way of example, which are located on three different cube sides of the six cube sides f1-f6. The assignment of measurement value to be represented to map point takes place, in accordance with the invention, directly on the basis of the measurement direction. For example, this is illustrated by way of the three map points d1-d3: the measurement direction 1a is assigned to the point d1, the measurement direction 1b is assigned to the measurement point d2, and the measurement direction 1c is assigned to the measurement point d3. The assignment of individual measurement data—image map points is thus effected without taking into consideration the distance from the respective object surface point Pa-Pc that is linked to the respective measurement direction 1a-1c (cf. FIG. 2), but only on the basis of the respective measurement direction 1a-c, independently of the measurement values or object points that are linked to the measurement directions 1a-c. The measurement value which is linked to a respective measurement direction 1a-c itself is thus not included in the generation of an image map, but is assigned to a respective map point on the basis of the assignment. If more than one measurement value is linked to a measurement direction in each case, i.e., in addition to the distance measurement value, also a noise factor or the intensity of the received measurement radiation, these are handled as separate layers. The cube map 3, which is created by way of the method according to the invention, permits a distortion-free representation directly after the scan (or a representation even during the scan for object points or partial regions which have already been scanned), and thus also a visual check of the scanning data by way of the user, as a result of which a check for completeness of the scan can be conducted e.g. even in situ.

The representation of the scanning data is effected subsequently e.g. on a display unit (GUI) of the measurement device itself, or preferably on augmented reality spectacles or a head-up display, which is connected e.g. to the measurement device or to a tablet or smartphone. Such external devices have the advantage, among others, of offering a clearer representation of the scan as compared to a measurement device display. If a representation is effected by way of an external device, an automatic adaptation of the representation is effected, e.g. by automatic adaptation of the brightness depending on the field of vision, for which purpose for example a camera that is connected to the measurement device, or a camera of the external device itself, provides the necessary information relating to the light conditions in the field of vision. Alternatively or additionally effected is a detection of the alignment of the device and adaptation of the represented field of vision or section of the scanned region. The number of the points d1-d3 of an image map 3 is here dependent on a predetermined display resolution, which in turn can be dependent on the intended display unit. In other words, the greater the display resolution is, the greater is the number of the points of the cube map 3, and the greater is the display point density per cube area f1-f6.

Figure 4:
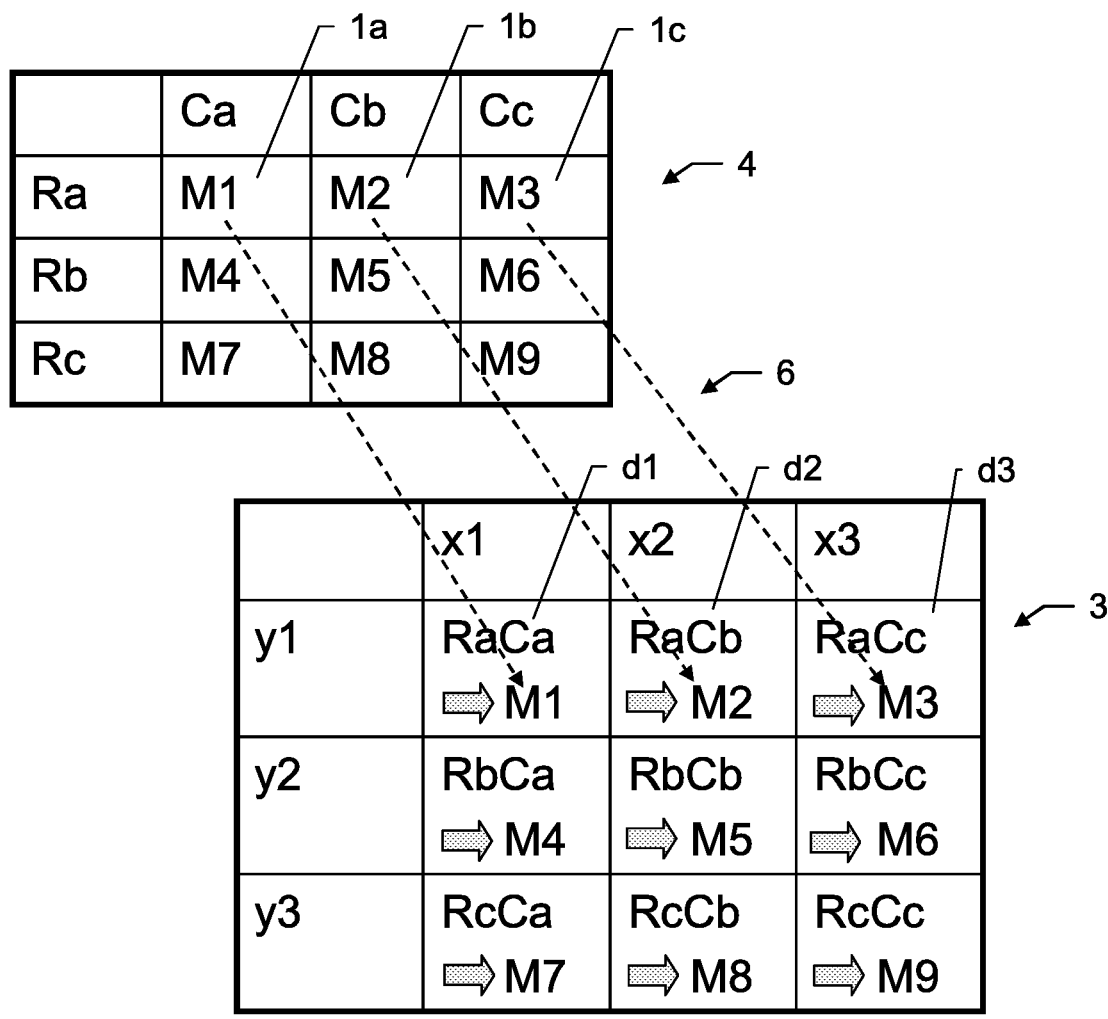

FIG. 4 schematically shows an assignment according to the invention by way of tables. FIG. 4 shows firstly the matrix 4 having the rows Ra-Rc and the columns Ca-Cc, in which the scanning data are organized in accordance with the scanning grid. The individual fields of the matrix 4 here denote a respective measurement direction, as a part of which the measurement directions 1a-c are shown, and contain the measurement values M1-M9 that are linked to the respective measurement direction. FIG. 4 also shows the image map 3 in table form, which organizes the map points in row and column form (each field denotes a map point), as a part of which the points d1-d3 are shown. The assignment 6 of measurement point to map point is now carried out by way of the image map table 3 having, for each map point, the indexes of the corresponding measurement directions, as a result of which a measurement value M1-M9 is assigned to each map point. By way of example, the image map field x1y1, or the map point d1, is associated with the measurement direction 1a, such that the measurement value M1 is assigned to the map point d1, the image map field x2y1, or the map point d2, is associated with the measurement direction 1b, such that the measurement value M2 is assigned to the map point d2, etc.

If more than one measurement value M1-M9 is linked to a measurement direction 1a-c, i.e. for example in addition to the distance measurement value, a noise factor or a measurement value such as a scanning data density, then these are likewise assigned to the respective image map field. In addition, in one development of the method, metadata such as text files, images, CAD data, point coordinates or distance values between ascertained coordinates of object points are linked to a measurement direction 1a-c or an image map point d1-d3. This is effected, for example, by way of a user marking a map point d1-d3, which is displayed on a display unit, and linking a text or image to this point. This link is stored as an additional layer of the image map 3, such that it is graphically representable—preferably together with a further layer.

Since, in the case of a predetermined scanning region and a predetermined scanning resolution, the scanning grid and also the measurement directions 1a-1c are already known (at least in principle in the form of predetermined measurement directions, aside from deviations from the target of the actually achieved measurement directions), and also the image map 3 is predetermined on the basis of the predetermined display resolution and the scanning region to be represented, the assignment 6 is also predetermined or pre-calculated to a high degree. In other words, it is not necessary, for example, to first calculate 3D object point coordinates from the recorded scanning data in order to create the assignment rule. If the assignment 6 is effected, as in the example according to FIG. 4, by way of tables, the linking of the fields of the matrix 4 to the fields of the image map 3 is thus defined in advance, i.e. already before the recording of the object points or measurement values, e.g. linking of the map field of the index x1y1 (map point d1) to the matrix field RaCa (measurement direction 1a). In that case, only the measurement values M1-M9, which were ascertained by way of the scan, need to be placed into the matrix 4, as a result of which the measurement values M1-M9 are also assigned to a respective image map point on the basis of the predetermined assignment 6 and can be displayed on a display. The method according to the invention thus requires significantly less computation effort compared to methods of the prior art, which permits immediate representation of the scanning data, and this even with a comparatively low computational power, as is the case in laser scanners or total stations, such that the representation even directly on a display of such measurement devices is made possible.

Figure 5:
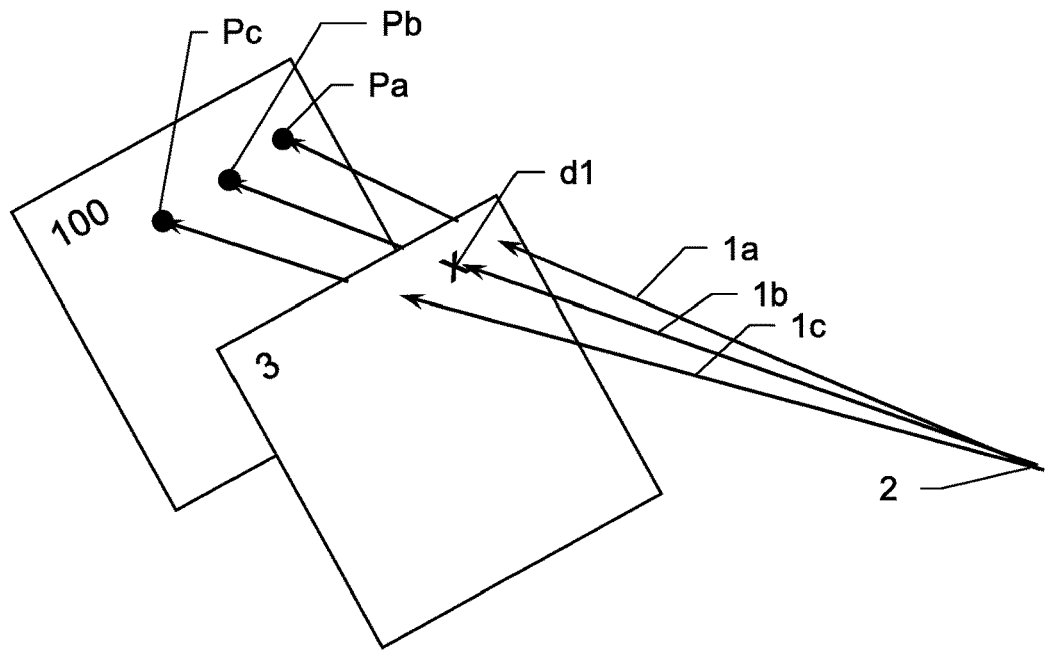

FIG. 5 schematically illustrates a development of the method, in which the assignment is effected adapted to the predetermined display resolution, by way of the number of the measurement directions used for the assignment being equal to the number of cube points d1-d3. If the scanning resolution is greater than the desired display resolution (which is typically the case), then the number of the actually present (measured) measurement directions 1*a*-*c* is greater than the number of the measurement directions 1*a*-*c* that are to be taken into consideration for the representation of the scanning data. In other words, not all measurement directions which are present on the basis of the scan are used, but, as shown in FIG. 5, for example only every other measurement direction (if there are twice as many measured measurement directions as representation points). FIG. 5 shows a section of the object surface 100, on which three surface points Pa-Pc are measured which are linked to the respective measurement directions 1*a*-*c*, which start from the measurement reference point 2. The scanning resolution is greater than the desired display resolution, and thus the number of the measurement points Pa-Pc is greater than the number of the map points to be represented of the map 3, of which one point d1 is shown by way of example. In other words, selection is made from all measurement directions 1*a*-*c*, and e.g. the measurement direction 1*b* is used for the assignment, because it is closest to the point d1, whereas the measurement directions 1*a* and 1*c* are not taken into consideration for the assignment. Accordingly, the measurement value of the surface point Pb is assigned to the map point d1 and finally represented as a brightness or color value on a display, and the measurement values of the points Pa and Pc are not taken into consideration for the representation of the scanning data.

Instead of such a simple, regular thinning or resolution reduction on the basis of the measurement direction that is closest to a respective map point, alternatively that measurement direction to which the measurement value with the highest quality and/or information content is linked, e.g. that distance value which is the most accurate, is selected from a group of measurement directions that are located e.g. within a defined angular or direction region. If, in the example of FIG. 5, the measurement value belonging to the object point Pa, or to the measurement direction 1*a*, is significantly more accurate than that of point Pb, or direction 1*b*, the measurement direction 1*a* is used for the assignment. This process is additionally or alternatively applied if the measurement value belonging to the object point Pa results in a significantly greater additional volume of surface information than the object point Pb, e.g. because the point Pa is located at an object edge, whereas the point Pb is located in an object surface that is already sufficiently known or is described by further recorded surface points, such as Pc. Object points Pa-Pc that belong to structure-rich surface sections generally have a high information content, whereas points Pa-Pc that are located on regular planar surfaces have a low information content (a plane is ideally already sufficiently known from three points). In the case of a scanning resolution which is much greater than the display resolution, the object point density and the measurement direction density are also much greater than the map point density, with the result that the deviations, e.g. between the measurement directions 1*a* and 1*b*, are practically negligible.

For this reason, within certain boundaries, such a selection on the basis of quality criteria is practically not associated with disadvantages with respect to the representation and evaluation of the scanning data on the basis of the representation. The quality-dependent assignment optionally comprises that the scanning region be divided into a number of partial regions, with the number of partial regions corresponding to the number of image map points and in each case those measurement directions that have within respective partial regions the highest quality as compared to the further individual measurement data of the respective partial regions being selected.

Scanning data are frequently recorded at such a high scanning resolution that their fineness is not perceivable in a visual representation in any case and is also often not relevant for the evaluation of the scanning data. For this reason, a reduction of the scanning resolution according to the invention to the display resolution is generally practically not associated with disadvantages.

However, this procedure offers advantages with respect to the scanning data volume, since this volume can be reduced without practical disadvantages during the visual perception of the scanning data and scanning data evaluation, which makes faster processing of the scanning data possible, e.g. for representation or editing still in situ where scanning took place and for a wireless transfer of the data from the measurement device to an external data processing device, such as e.g. a smartphone or a tablet.

The data volume which is reproduced in this way makes possible e.g. that the above-described insertion of metadata can be performed by a further user, who is located e.g. at a remote location and to whom the reduced scanning data set was sent directly after the scan. In addition, as a further optional and advantageous step, the scanning data thus supplemented, or parts thereof, can be transferred back to the measurement device, and subsequently for example the thus supplemented scanning data can be represented to the first user on a display (of the measurement device or e.g. of a smartphone in situ). For example, regions that were not completely recorded, insufficiently recorded or recorded with errors and therefore have to be scanned (again) are displayed in situ to the user performing the scan. The method in accordance with the invention thus permits a quick (initial) evaluation of the scanning data, as a result of which e.g. errors or a requirement for correction of a scan can be recognized quickly and be remedied immediately in situ by the user, which results in a significant lowering of costs and time needed.

In addition, such a reduction of the scanning data volume facilitates the representation and processing thereof even further. For example, in a development of the method, linking of scanning data sets of different (neighboring) locations or scanning regions is effected either manually, by way of the user marking corresponding points or partial regions of the scanning regions in the representation, or automatically, wherein additional positional data are used herefor which are ascertained using a sensor unit (e.g. an IMU or a GPS receiver) of the measurement device.

Figure 6:
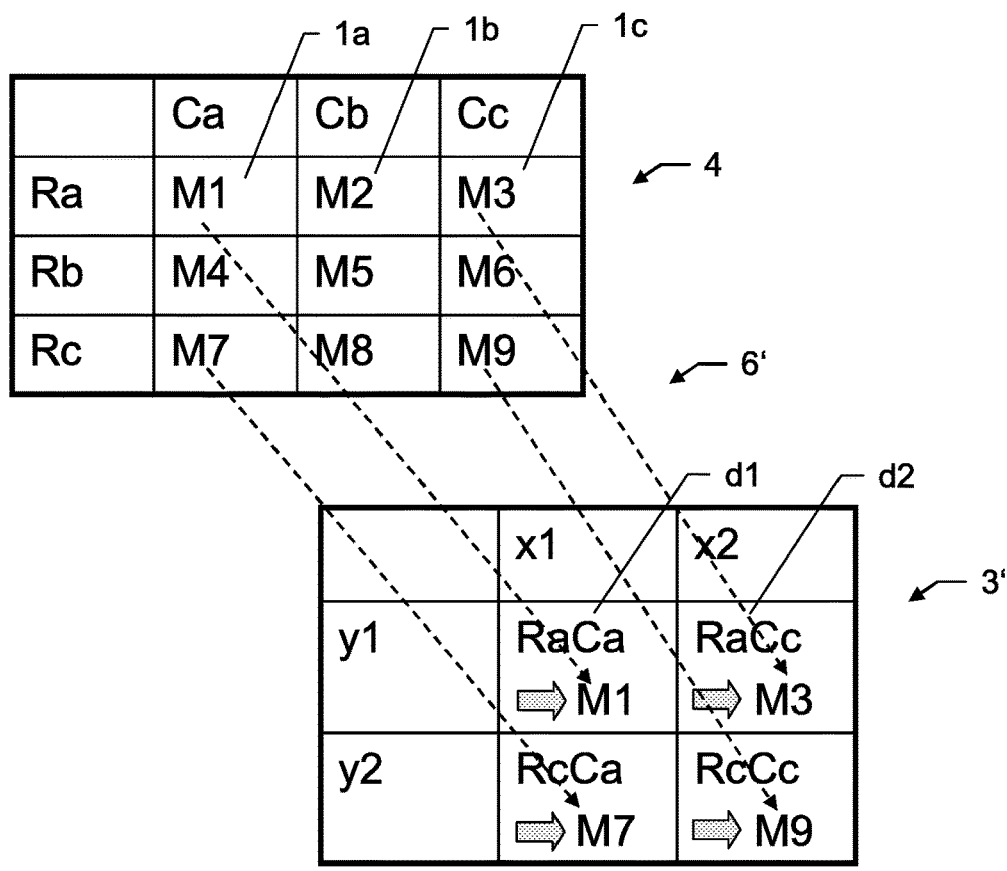

FIG. 6 illustrates an assignment 6', adapted to a predetermined display resolution, with uniform reduction of the scanning resolution to the display resolution in the case of an assignment 6' by way of matrix or table. FIG. 6 shows, like FIG. 4, a matrix 4 with the measurement values M1-M9, which are linked to the respective measurement directions (marked in part are measurement directions 1*a*-*c*) and an image map 3' in table form. It differs from FIG. 4 in that the display resolution is lower than the scanning resolution, with the result that the table 3' now only has four fields instead of nine, i.e. fewer than the matrix 4. A map point is assigned not to every measurement value M1-M9, but only to those of every other column and row. For example, the measurement value M1 is assigned to the point d1 with the index x1*y*1, and the measurement value M3 is assigned to the point d2 with the index x2*y*1 (instead of the measurement value M2, as is the case in the example of FIG. 4 with the same scanning and display resolutions).

Figure 7A:
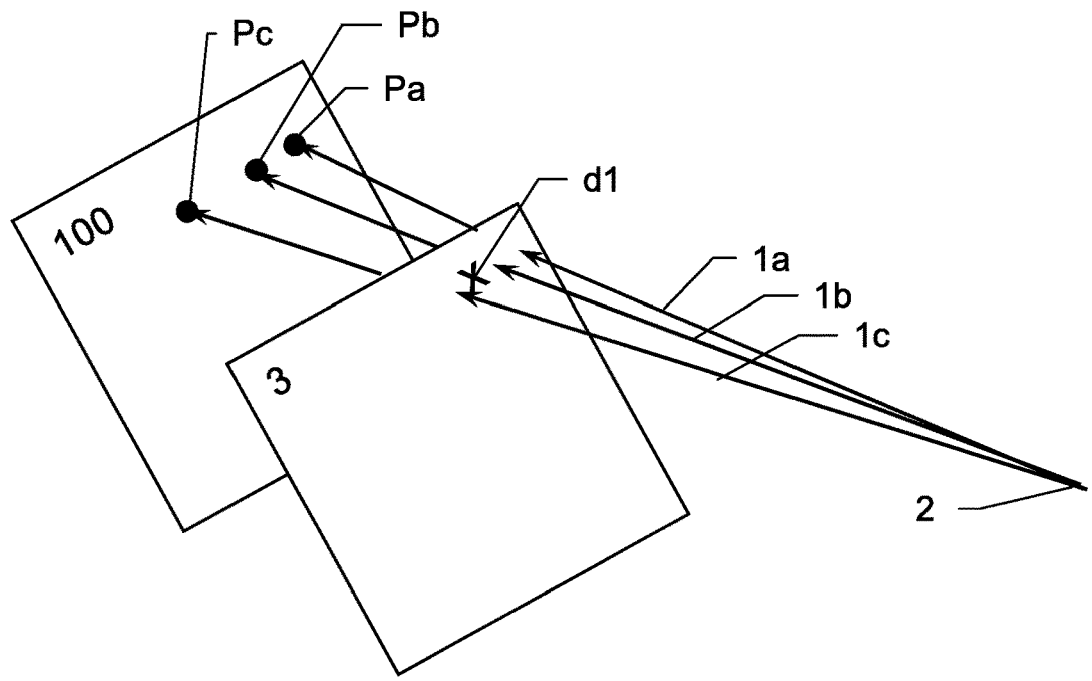
Figure 7B:
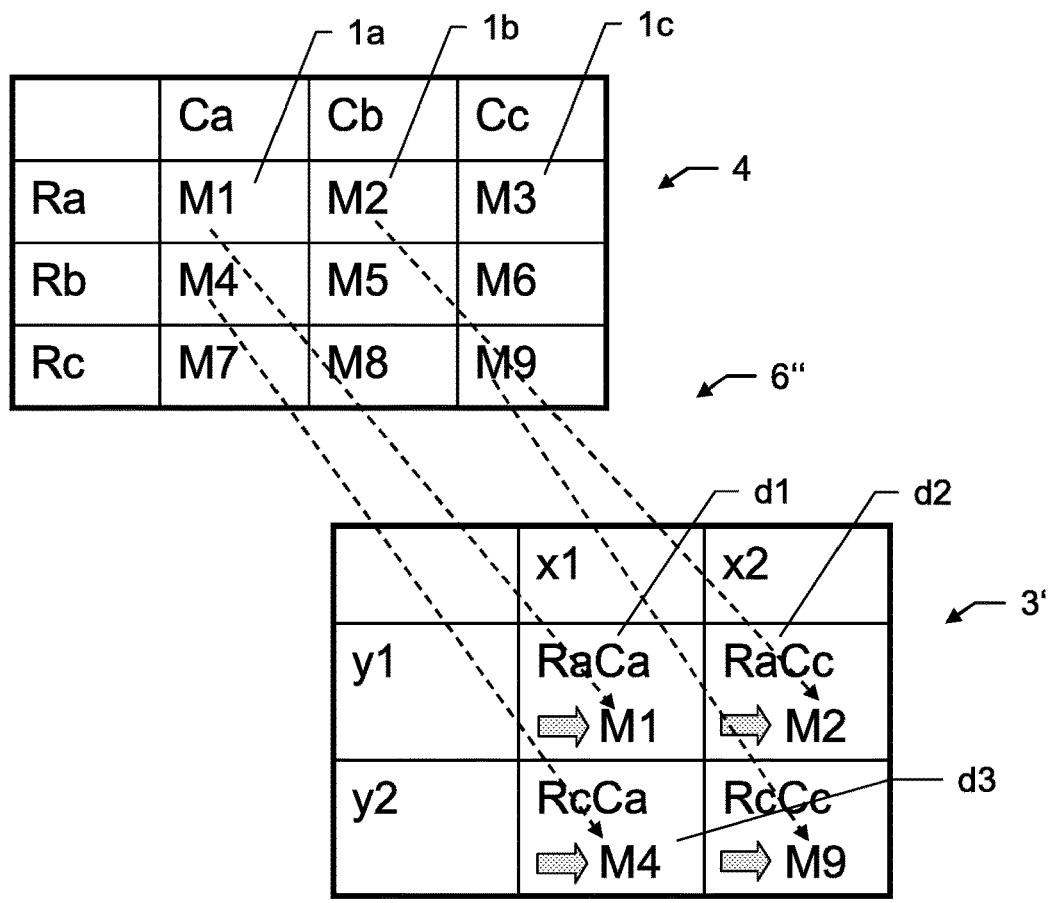

FIGS. 7*a* and 7*b* schematically illustrate another development of the method according to the invention. Here, as part of the method, systematic, i.e. reproducible, device errors are taken into consideration in the assignment rule. Errors of this type of a measurement device having a scanning functionality are primarily axial errors or errors caused by latency times in the synchronization between angular measurement (for determining the measurement directions) and distance measurement. Owing to the reproducibility, these are taken into consideration in the generation of the image map by way of the assignment rule, with the result that the representation of the scanning data is thus effected in a way in which it is already corrected in terms of measurement errors. Device errors relating to angular measurements by way of which the measurement directions are determined are hereby preferably compensated. Optionally, the device errors are determined individually for the measurement device by way of a calibration process and then taken into consideration in the assignment rule on the basis of the thus ascertained calibration parameters. The device errors can here be represented substantially by the following calibration parameters: index error of the 2-axis inclination sensor, or the standing axis skewness, index error (angle offset) of the vertical angle sensor, collimation error of the target line, and tilt axis skewness. The calibration process and the inclusion of the calibration parameters in the assignment rule are here effected by way of factory settings before the measurement device is delivered. In addition, (re-) calibration and updating of the calibration parameters or of the rule by way of the user, e.g. before each scanning process, are optionally additionally performed.

FIG. 7a schematically illustrates the inclusion of a device error in the assignment rule. Owing to the device error, e.g. an axial error, the actually achieved distribution of the measurement directions 1a-1c, and thus the distribution of the object points Pa-PC, deviates from the ideal regular grid (cf. FIG. 5). For this reason, in this case, the measurement direction 1b is not closest to the map point d1, as in the ideal case according to FIG. 5, but the measurement direction 1c. For this reason, the assignment to the map point d1 is effected on the basis of the measurement direction 1c (not on the basis of the measurement direction 1b, as would be the case without device errors). Accordingly, the measurement value that belongs to the measurement direction 1c, or to the object point Pc, is assigned to the map point d1.

FIG. 7b shows in table form an assignment 6" of this type which corrects measurement errors. FIG. 7b is based on FIG. 6, which shows a selecting assignment 6' adapted to a lower display resolution, in which every other measurement direction, or every other column and row of the grid, is simply left out. The assignment 6" illustrated here is still based on this principle, but improves upon it by way of a device error compensation being effected, as opposed to in FIG. 6, which selects in fact the most suitable measurement direction on the basis of the inclusion of the known measurement errors. The result of this is that it is no longer e.g. the measurement value M3 that is assigned to the map point d2, as would be the case without device errors, but the measurement value M2, and instead of the measurement value M7, it is the measurement value M4 that is assigned to the map point d3. The representation of the map point d1 on a display is thus effected in accordance with the measurement value M2, and that of the map point d3 in accordance with the measurement value M4.

What is claimed is:

1. A method for visually representing scanning data, the method comprising:

recording scanning data having a multiplicity of individual measurement data, the scanning data being recorded with a measurement device having a scanning functionality for recording object surfaces using measurement radiation, wherein the individual measurement data in each case have at least one measurement value linked to a respective measurement direction, including in each case a distance measurement value, measured by way of the measurement radiation, from a surface point that is located in the measurement direction, wherein:

all measurement directions start from a common measurement reference point, and the measurement directions are different from one another such that a predetermined scanning region with a predetermined scanning resolution is covered, and visually representing the scanning data using an image map with a number of map points that are dependent on a predetermined display resolution by way of an assignment rule for assigning of said at least one measurement value linked to the respective measurement direction to said map points, wherein the assignment of the at least one measurement value is effected directly on the basis of the respective measurement direction to which the at least one measurement value is linked and to which the corresponding map point is associated, wherein systematic device errors of the measurement device are taken into consideration in the assignment rule, with the result that the representation of the scanning data is effected on the basis of the error-correcting assignment rule in a device-error-corrected fashion.

2. The method according to claim 1, wherein the scanning data:

is effected as a panorama representation, is effected by way of a cube map, cube representation, is effected using a display unit having a number of display points that are arranged over the surface, and in that a brightness or color value, which represents a measurement value, is assigned to each display point by way of the assignment rule in dependence on a respective field of vision to be displayed as a section of the image map, wherein the measurement value belongs to one of the recorded surface points located in the field of vision, or the generation of the image map is effected by way of a control and evaluation unit of the measurement device.

3. The method according to claim 1, wherein the systematic device errors for the measurement device are determined individually by way of a calibration process in the form of calibration parameters, and the device errors are taken into consideration in the assignment rule on the basis of the calibration parameters, and relate to angular measurements for determining the measurement directions.

4. The method according to claim 1, wherein the assignment is effected adapted to the selected display resolution, and thus of individual measurement data from the multiplicity of the individual measurement data as part of the assignment.

5. The method according to claim 4, wherein reduced scanning data set is created based on the assignment rule and adapted to the selected display resolution, and said set is transferred wirelessly to an external data processing device.

6. The method according to claim 1, wherein the measurement reference point:

is a center of the measurement device, corresponds to the center point of the cube in the case of an image map being present in the form of a cube map, and the measurement directions are present in the form of polar and azimuth angles.

7. The method according to claim 1, wherein the assignment rule is in the form of a look-up table, in which the assigned measurement value or values are directly retrievable for each map point.

8. The method according to claim 1, wherein a regular grid is formed by way of the measurement directions, and the individual measurements are stored in a matrix, imaging the regular grid, with a column and row index, wherein each map point is assigned a field of the matrix.

9. The method according to claim 1, wherein an automatic adaptation of the representation is effected:
in dependence on the selected field of vision,
in dependence on the alignment of a representing display unit relative to the scanning region, or
metadata is linked to a map point or to a measurement value that is assigned to the map point by way of a display point and are representable.

10. The method according to claim 1, wherein the representation is effected in situ:
on a display unit of the measurement device, or
on an external device that is connected to the measurement device wirelessly or in wire-bound fashion.

11. The method according to claim 1, wherein in addition to the distance measurement value, at least one of the following measurement values is assigned to a cube point by way of the assignment rule and is thus representable individually or combined with other measurement values including:
intensity of the measurement radiation,
noise factor,
measurement accuracy,
scanning data density, or
color information relating to the scanning region which is recorded using a camera.

12. The method according to claim 1, further comprising:
linking two or more scanning data sets recorded using the measurement device at different sites.

13. A computer program product, stored on a non-transitory machine-readable carrier, that causes a processor executing the computer program product to perform the method according to claim 1.

14. A measurement system having a scanning functionality, the system comprising:
a control unit configured to cause the recording of scanning data having a multiplicity of individual measurement data, the scanning data being recorded with a measurement device of the control unit having a scanning functionality for recording object surfaces using measurement radiation, wherein the individual measurement data in each case have at least one measurement value linked to a respective measurement direction, including in each case a distance measurement value, measured by way of the measurement radiation, from a surface point that is located in the measurement direction,
wherein:
all measurement directions start from a common measurement reference point, and
the measurement directions are different from one another such that a predetermined scanning region with a predetermined scanning resolution is covered, and
an evaluation unit which generates a representation of scanning data using an image map with a number of map points that is dependent on a predetermined display resolution by way of an assignment rule for assigning of said at least one measurement value linked to the respective measurement direction to said map points, wherein the assignment of the at least one measurement value is effected directly on the basis of the respective measurement direction to which the at least one measurement value is linked and to which the corresponding map point is associated, wherein systematic device errors of the measurement device are taken into consideration in the assignment rule, with the result that the representation of the scanning data is effected on the basis of the error-correcting assignment rule in a device-error-corrected fashion.

* * * * *